United States Patent [19]
Bird

[11] 3,902,566
[45] Sept. 2, 1975

[54] HYDRAULIC DRIVE SYSTEM FOR VEHICLE

[76] Inventor: James M. Bird, 6737 E. 12th St., Tulsa, Okla. 74112

[22] Filed: Sept. 17, 1973

[21] Appl. No.: 398,056

Related U.S. Application Data

[63] Continuation of Ser. No. 195,952, Nov. 5, 1971, abandoned.

[52] U.S. Cl. .................. 180/66 F; 60/468; 91/6.5
[51] Int. Cl. ............................................. B60k 17/10
[58] Field of Search .......... 180/66 R, 66 F; 60/468, 60/490, 494; 91/6.5

[56] References Cited
UNITED STATES PATENTS

| | | | |
|---|---|---|---|
| 3,091,930 | 6/1963 | Thoma et al. | 180/66 R |
| 3,232,056 | 2/1966 | Heinrich et al. | 60/494 |
| 3,292,723 | 12/1966 | Pinkerton et al. | 180/66 R |
| 3,303,901 | 2/1967 | Schou | 180/66 R |
| 3,458,005 | 7/1969 | Malm et al. | 180/66 R |
| 3,581,682 | 6/1971 | Kontranowski | 180/66 F |
| 3,655,004 | 4/1972 | Hoashi | 180/66 R |
| 3,656,570 | 4/1972 | Gortnar et al. | 180/66 R |

Primary Examiner—David Schonberg
Assistant Examiner—David M. Mitchell
Attorney, Agent, or Firm—Robert C. Smith; William F. Thornton

[57] ABSTRACT

A hydraulic system is described for a hydraulically propelled four-wheel drive vehicle which also carries and provides power for a large hydraulically powered load device. The system is an open loop or modified open loop system permitting straightforward additions of auxiliary equipment and other load devices as needed. The high pressure pump output is connected to the individual wheel motors through reversible manually operated valves. The front wheel circuits include special valve means for permitting the front wheels to "free wheel" when four-wheel drive is not desired. A plurality of lines having adjustable orifices provide fluid connections between the pairs of front and rear wheels to provide differential type action. Similar lines between front and rear wheel circuits provide front-to-rear differential action. Each wheel is operative in either of two speed ranges, and additional manually operated valve means enables the operator to select whether he wishes to operate in low or high speed range.

8 Claims, 4 Drawing Figures

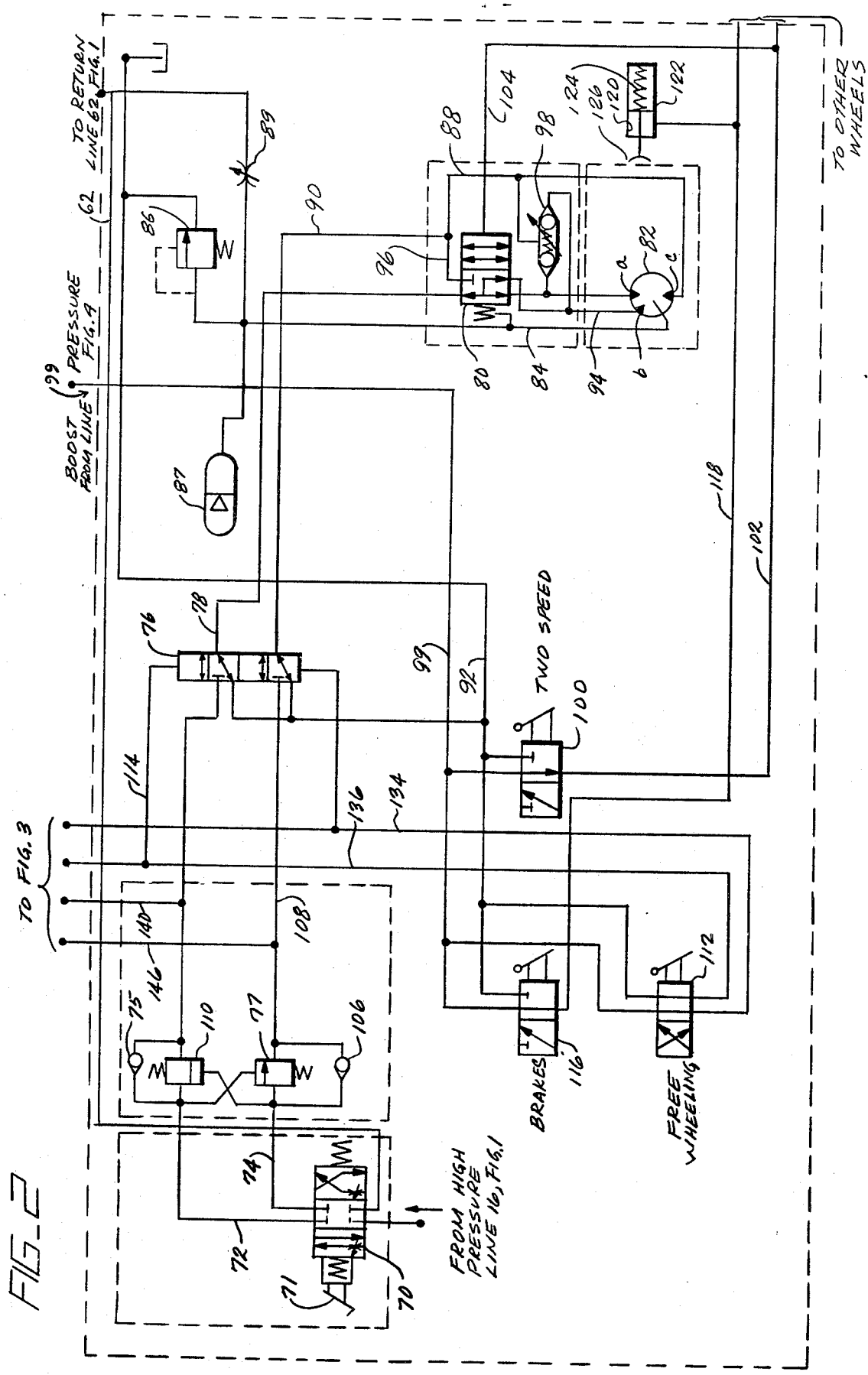

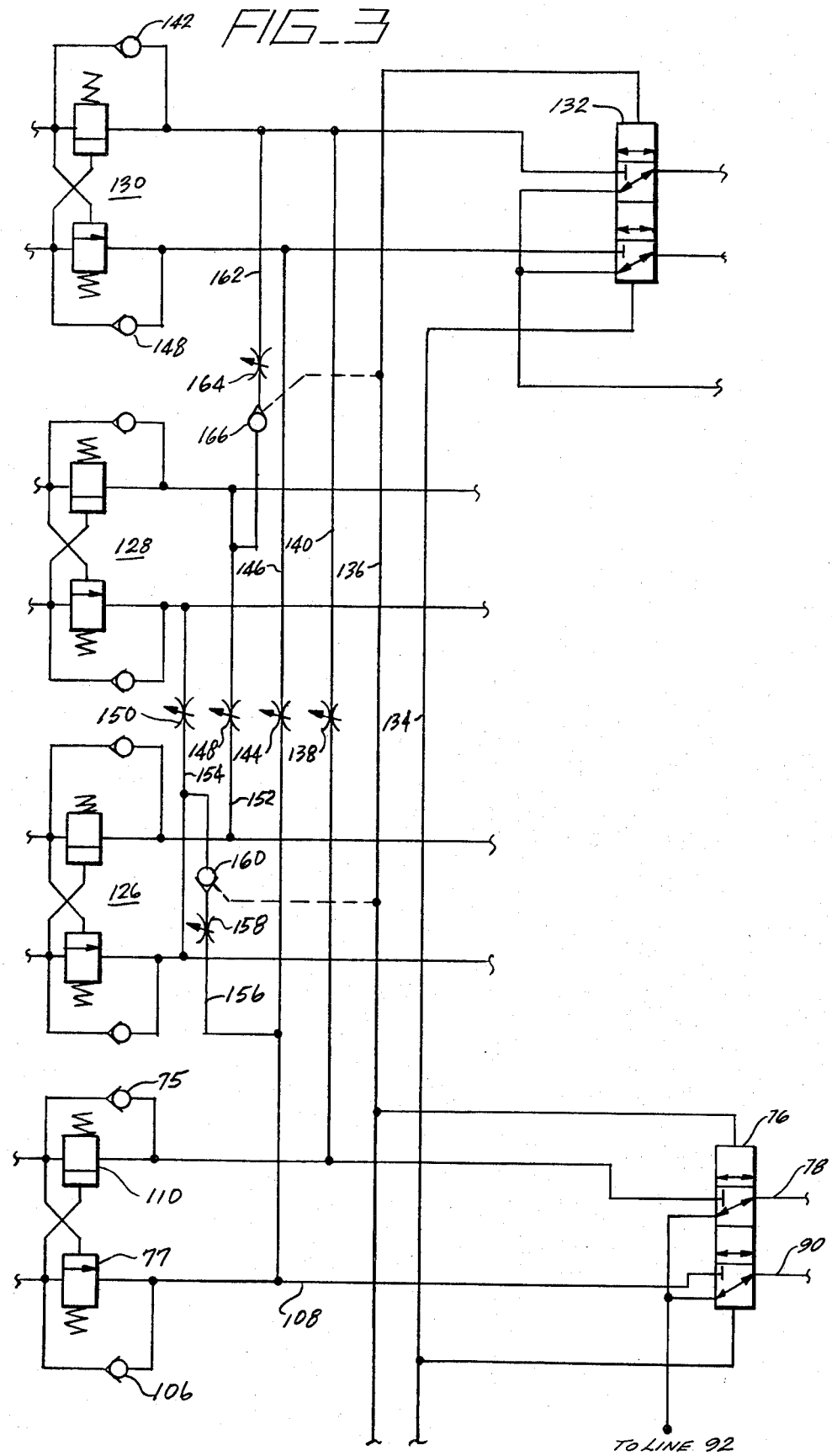

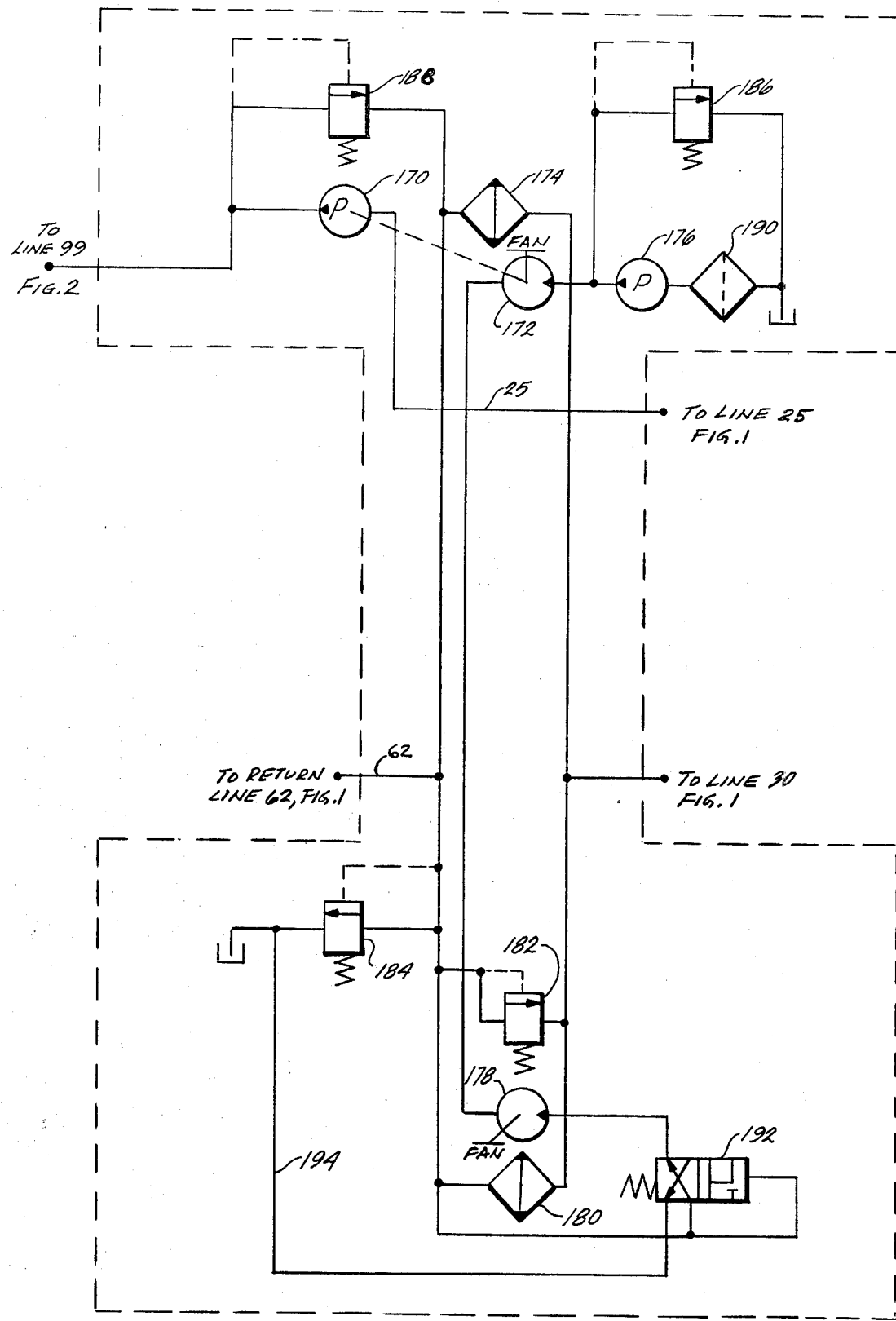
FIG_4

HYDRAULIC DRIVE SYSTEM FOR VEHICLE

This is a continuation of application Ser. No. 195,952, filed Nov. 5, 1971 and now abandoned.

BACKGROUND OF THE INVENTION

Unitl quite recently there has been comparatively little activity in connection with the design and building of hydraulic drive systems for large vehicles. This probably results from the fact that conventional drive shaft operation has been satisfactory for almost all applications, whether for two or four-wheel drive systems. In a recent design effort for a large off-road vehicle, applicant found that for a number of reasons a conventional drive shaft arrangement forced certain compromises which were not satisfactory. The vehicle carries a heavy hydraulically driven load device requiring a large engine and pump to drive the load device in what may be considered an open loop or modified open loop circuit. It has been more common practice to use closed loop hydraulic systems for driving hydraulically driven vehicles. The vehicle itself preferably was to be equipped with four-wheel drive and should have as low as possible a center of gravity commensurate with acceptable ground clearance in order to provide stability in rough terrain. With these factors in mind, it became apparent that a hydraulic drive system would provide great advantages since a single engine and pump could drive both the load device and the vehicle and would not require mechanical shafts connecting the power plant with both sets of drive wheels, which would simplify the drive arrangements as well as making possible a lower center of gravity.

Once one decides that a hydraulically driven vehicle is desirable, many design problems appear which are not subject to conventional solutions, particularly since the load device requires an open loop or modified open loop system. Does the machine need to have a plurality of operating speeds?If so, how is this to be accomplished?Is the machine to operate in both two-wheel and four-wheel drive, and if so, how is this to be implemented?How does one accomplish the function of a set of differential gears?How is the machine to be steered? These and many other questions must be satisfactorily resolved in order to produce a satisfactory vehicle.

SUMMARY OF THE INVENTION

Applicant has provided a hydraulic drive system for a vehicle which is capable of operating a large load device and providing propulsion for the machine with a single prime mover and high pressure pump. The general configuration of the machine is shown and described in Application Ser. No. 89,912 filed in the names of James M. Bird, Arling D. Christensen and Kenneth W. Verge. To provide maneuverability, an articulated steering arrangement is used having large power steering cylinders. The power steering system uses open center valves and normally operates at lower pressure, so it was considered preferable to supply this system from its separate smaller pump. The high pressure pump output is supplied to a plurality of manually operated valves which connect this output to the large rotary hydraulic wheel motors. These valves are reversible to permit the vehicle to back up. The wheel motors include a plurality of internal pistons which are connected into the high pressure supply such that two speed ranges are provided. One range uses all pistons and develops maximum torque, and the higher speed range connects half of the pistons, reducing the torque to approximately half. For the front wheels, a free wheeling arrangement is provided making it possible to divert the high pressure pump output to the rear wheels which provides a higher speed range for on-highway use or where the terrain permits.

Early in the development of the machine it appeared that the high pressure lines to the wheels provided a very unyielding connection between the pump and the wheels such that the wheels which were connected to the pump always wanted to turn at the same speed. This pointed up the need for a differential type of action which was provided by connecting a plurality of lines between the individual wheel circuits with small adjustable orifices in the lines. This permitted extra flow from the slower wheel to the one of each pair of wheels which wanted to turn the fastest. In four-wheel drive, the front and rear wheels do not turn in the same track, so similar lines were required between front and rear wheel circuits to permit the front wheels to turn faster, as they normally do. Check valves responsive to the free wheeling control pressure are inserted in these lines to prevent flow except during four-wheel drive operation. Thus the lines above described with the variable orifices provide very adequate differential action for both two and four-wheel drive operation. The orifices are sized, however, so that in case a wheel loses traction, it cannot take so much high pressure fluid that it spins out and takes the driving fluid away from the opposite wheel or other wheels.

The open loop or modified open loop arrangement described herein permits greater flexibility in adding auxiliary equipment and other load devices than is normally available with the closed loop system, which normally would be somewhat more conventional in propulsion systems for vehicles. It also simplifies the arrangements for providing the various lower level pressure drops such as those required to operate the free wheeling, two-speed, braking and power steering systems.

REFERENCE TO COPENDING APPLICATION

Application Ser. No. 89,912 filed Nov. 16, 1970, in the names of James M. Bird, Arling D. Christensen and Kenneth W. Verge.

DESCRIPTION OF THE DRAWINGS

FIG. 2 is a schematic diagram of a typical wheel motor control circuit including two-speed, brake and free wheeling arrangements;

FIG. 3 is a schematic diagram of the wheel circuit interconnections providing differential action for the vehicle; and FIG. 4 is a schematic diagram of certain auxiliary power sources and equipment with interconnections to the power supply.

DESCRIPTION OF THE PREFERRED EMBODIMENT

Figure 1:
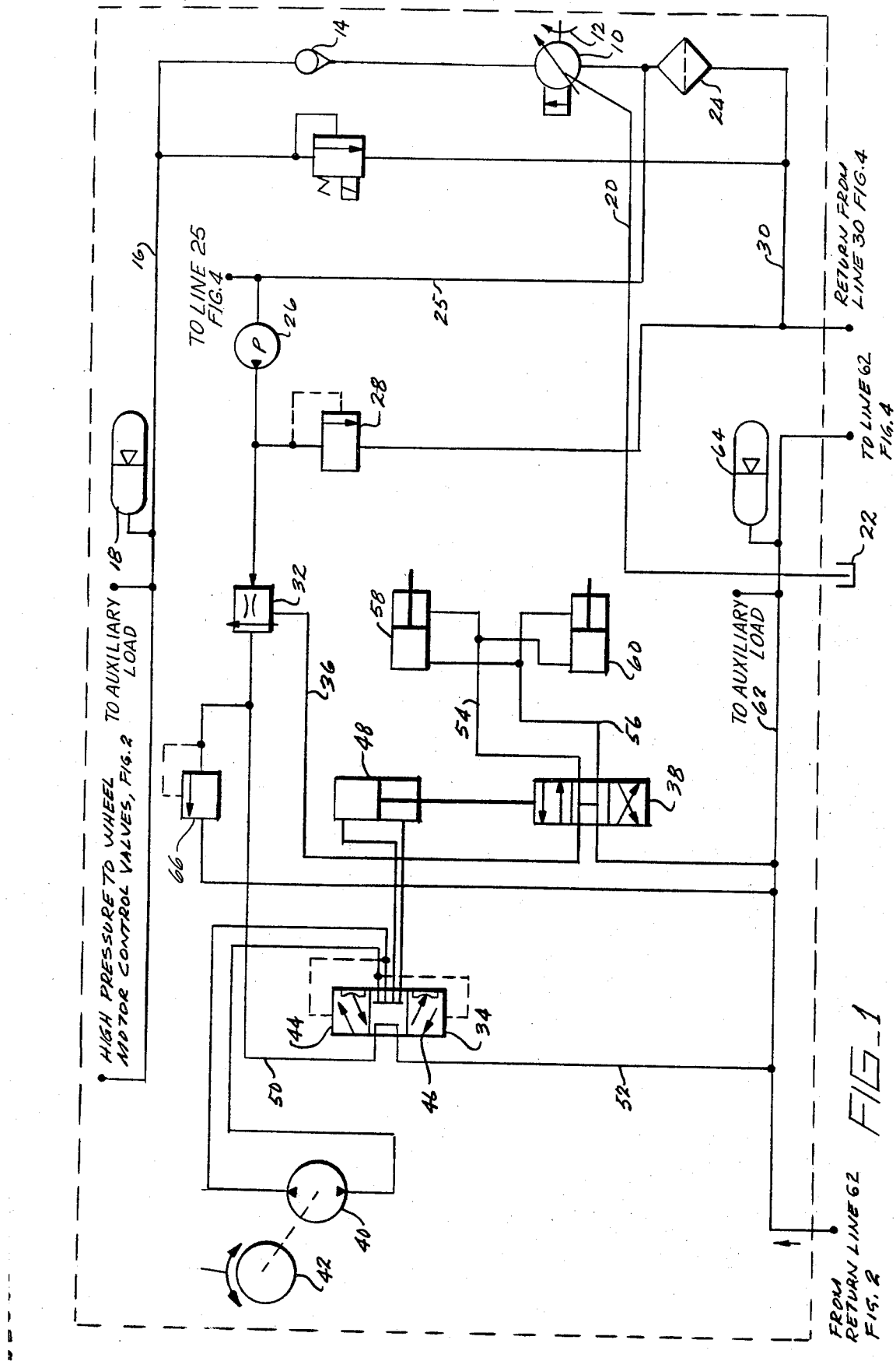
FIG. 1 is a schematic diagram of the main power supply and power steering portions of the system.

Referring now to FIG. 1, a variable displacement pressure-compensated pump 10 is driven through a shaft 12 by means of any suitable prime mover such as a gasoline or diesel engine (not shown). The output of pump 10 is supplied through a check valve 14 and is maintained in a line 16 at a suitable high working pressure such as 3000 psi. An accumulator 18 connected to line 16 assists in maintaining this working pressure. High pressure line 16 is connected to the wheel circuits discussed below and any associated hydraulically driven load device. A line 20 connects pump 10 to a drain at 22 which may be at or near atmospheric pressure. The inlet side of pump 10 is connected to a filter 24 and through a line 25 to a pump 26 which provides operating fluid under pressure to the power steering system. The output pressure of pump 26 is regulated by means of a regulator 28 which responds to pressures above the desired level by bypassing the pump output to a return line 30 connected to one side of filter 24.

The output of pump 26 is supplied through an adjustable priority valve 32 connected to a control valve 34 and also having a connection through a line 36 to a pilot valve 38. Also connected to the control valve 34 is a reversible hand pump 40 which is operated by the operator's steering wheel 42. Hand pump 40 operates to vary the control pressure on the ends of control valve 34 to cause it to slide in such direction that either the upper port structure 44 or the lower port structure 46 is in position to communicate pressure from steering pump 26 to a hydraulic motor 48. As shown, control valve 34 is in a neutral position, and steering pump pressure is communicated through lines 50 and 52 to the return line 30 of pump 10.

Also connected to the priority valve 32 is a slide-type control valve 38 which is movable with the piston in hydraulic motor 48 to direct steering pump pressure through a pair of hydraulic lines 54 and 56 to opposite sides of a pair of power steering cylinders 58 and 60. As shown, valve 38 is in a neutral position, and flow either into or out of the steering cylinders is blocked. When the upper portion of slide valve 38 is in registry with the lines 54 and 56, steering pressure is communicated with the right side of cylinder 58 and the left side of cylinder 60, and the opposite side of each cylinder is connected to a return line 62. This line carries return pressure from the motor control valves of FIG. 2 and is maintained at a somewhat higher pressure than that in line 30. An accumulator 64 helps to maintain this pressure. Any auxiliary load devices requiring high pressure are connected between lines 16 and 62. When slide valve 38 is moved to place its lower portion in registry with lines 54 and 56, these connections are reversed, reversing the direction of steering. A conventional pressure-limiting valve 66 limits steering pump pressure at the inlet to control valve 34. Thus it will be appreciated that priority valve 32 is adjustable such that adequate fluid will always be available to operate hydraulic motor 48 as needed to position slide valve 38, and yet when slide valve 38 is in position to connect pump pressure to cylinders 58 and 60 these cylinders will receive substantially full steering pump pressure.

FIG. 2 is a schematic diagram of the hydraulic connections associated with control of each individual wheel motor. Each wheel is, in effect, a two-speed hydraulic motor; thus a four-wheel drive vehicle will have four such hydraulic circuits which are essentially identical with minor exceptions as set forth below.

The high pressure line 16 of FIG. 1 is connected to a main motor control valve 70 which is linearly movable as by a treadle 71 to control the registry of the ports within the valve with respect to the high pressure line 16, return pressure line 62 and control lines 72 and 74. When the porting at one end of control valve 70 is in registry with the above lines, the pressure supplied to the motor will cause rotation of the motors in a first direction, and when porting at the opposite end is in registry with the lines, the pressure will be reversed and cause the motors to be turned in the opposite direction.

When high pressure fluid is connected to line 72 it flows past a check valve 75 to a slide valve 76 and also to a pressure-responsive valve 77. When slide valve 76 is in position to communicate high pressure fluid into a line 78, it is then supplied to a two-speed control valve 80 which connects this fluid to the wheel motor 82. The motor 82 has three operating ports designated $a$, $b$ and $c$, in addition to a port connected to a low pressure line 84. The low pressure line 84 is maintained at a pressure somewhat above the drain pressure by means of a pressure-regulating valve 86 for the purpose of maintaining a desired case pressure in motor 82. An accumulator 87 abosrbs pressure surges from the case of motor 82 when switching into four-wheel drive, which is discussed below. A restricted orifice 89 is connected between line 84 and return line 62 of FIG. 1. Control valve 80 is normally biased, as shown, to supply high pressure fluid to both ports $a$ and $b$ of motor 82, with port $c$ connected through lines 88 and 90, slide valve 76, valve 77 and control valve 70 to return line 62 of FIG. 1. With both ports $a$ and $b$ connected to the high pressure supply, the motor will develop maximum torque. When valve 80 is biased to its opposite position, only port $a$ gets maximum pressure and port $b$ is connected to return through conduits 94 and 96. This position provides a higher speed range with lower torque. A two-way check valve 98 responds to any undesirably high pressure surges appearing in the inlet lines to either of ports $a$ or $b$ by dumping the excess pressure to line 88. Hydraulic motors suitable for wheel motors 82 are available from Hagglund's (AB HAGGLUND AND SONER, ORNSKOLDSVIK, SWEDEN).

Control valve 80 is moved to the high speed position by means of a boost control pressure carried in a line 99 maintained at a substantial level through means discussed below. This pressure is communicated to valve 80 through a manually operated two-speed control valve 100 and lines 102 and 104. When valve 100 is in the opposite position from that shown, valve 80 is connected through lines 102 and 104 to a drain line 92.

When control valve 70 is moved to the opposite position from that described above, high pressure fluid is communicated to line 74, through a check valve 106, line 108, slide valve 76, lines 90 and 88 to port $c$ of motor 82. The high pressure in line 74 is also communicated to a pressure-responsive valve 110 which provides communication between slide valve 76 and line 72 and which then is connected to the return line 62 of FIG. 1. Thus the pressure across motor 82 now flows from port $c$ to port $a$ and to return, which reverses the direction of rotation of motor 82. It will be appreciated that control valve 70 may be modulated to provide incremental control of the output of motor 82 in either direction.

Additional control of motor 82 may be provided by means of a free wheeling control valve 112 also connected between boost pressure line 99 and drain pressure line 92. With the valve 112 in the position shown, boost pressure flows through valve 112 to the lower side of slide valve 76, forcing it upwardly. A conduit 114 connects the upper side of valve 76 to drain line 92 through valve 112. This is the normal position for free wheeling operation, blocking all high pressure connections to the motor 82 and connecting lines 78 and 90 to return. Moving the valve to the opposite position, as shown, reverses the connections to slide valve 76, moving it downwardly and causing it to assume a position connecting the high pressure lines to the motor 82 for normal powered operation.

The manually operated brake valve 116 is also effectively connected between boost pressure line 99 and drain line 92. When valve 116 is in the position shown, boost pressure flows through a brake line 118 to a chamber 120 in a brake cylinder 122 where it opposes and overcomes the force of a spring 124, thus holding the brake in its "off" position. Moving the brake valve 116 to its opposite position causes the fluid pressure in chamber 120 to be dumped to drain line 92 while blocking the boost pressure line. This permits the spring 124 to apply the brake shoe 126 to the wheel (motor 82).

As previously indicated, the front and rear wheel circuits are essentially as described except for minor differences. The principal difference is in the free wheeling arrangements. The vehicle may operate in four-wheel drive where the terrain requires it, but it is capable of greater speed in two-wheel drive. When two-wheel drive is desired, the front pair of wheels may be disconnected by means of the free wheeling arrangement described above, and full pump output is available to drive the rear pair of wheels. This provides road speeds somewhat greater than is possible in four-wheel drive--even with all wheels operating in the high speed range.

The schematic diagram identified as FIG. 3 utilizes some of the same subject matter as that described in connection with FIG. 2 and includes additional circuits for providing differential action between and among the wheels. It will be recognized that where a high fluid pressure source (such as 3000 psi) is connected through lines to the wheels that the forces tending to turn, for example, the right rear wheel and the left rear wheel will normally be essentially the same. Thus each wheel will tend to turn at exactly the same speed, which makes turning difficult unless the surface is such as to permit some sliding. The same phenomenon occurs between the front wheels and, as will be recognized by those familiar with four-wheel drive vehicles, it also occurs between the front and rear wheels. In FIG. 3 are four sets of check valves and pressure-responsive valves identical to check valves 75 and 106 and pressure-responsive valves 77 and 110. Each set is part of a wheel control circuit for a separate wheel. Thus sets 126 and 128 are connected to the rear wheel circuits and set 130 to the opposite front wheel circuit. Valve set 130 is connected to a free wheeling slide valve 132 which is identical to slide valve 76. A line 134 connected to free wheeling control valve 112 communicates with the lower side of both slide valves 76 and 132. Similarly, line 136, which is also connected to valve 112, communicates with the upper end of valves 76 and 130. Thus valve 132 will operate in synchronism with valve 76.

A variable orifice 138 is located in a line 140 connected between the downstream side of check valve 75 and the corresponding check valve 142 of valve set 130. Similarly, an orifice 144 is located in a line 146 connected between the downstream side of check valve 106 and its corresponding check valve 148 in valve set 130. When the front wheels are turning, the outside wheel will travel a greater distance than will the inside wheel and will normally displace more fluid in approximate proportion to the increased distance. If the valves 144 and 138 are closed, the high pressure fluid supplied to the wheel motors will be essentially the same, tending to positively drive them at the same speed, thus requiring one wheel to slip or skid. By opening valves 144 and 138, and assuming forward rotation of the motors as described above, the outside wheel will draw fluid through orifice 38 from the circuit of the inside wheel sufficient to make the proportion of working fluid supplied equal to the difference in displacement, since the loading between the wheels does not vary significantly. Orifice 144 will provide a similar function when the front wheels are turning in the reverse direction. Thus variable orifices 138 and 144 provide means for permitting the front wheel having the greater demand for working fluid to receive a flow from the wheel circuit of the wheel having the lesser demand. Similarly variable orifices 148 and 150 are located in lines 152 and 154 on opposite sides of valve sets 126 and 128 and provide similar differential action for the rear wheels.

Connected between lines 154 and 146 is a conduit 156 containing a variable orifice 158 and a check valve 160 which is operated to open in response to the presence of boost pressure in line 136. Similarly, a conduit 162 having a variable orifice 164 and a check valve 166 operative to open when boost pressure is present in line 136 is connected between line 152 and the line downstream of check valve 142. Thus when the front wheels are free wheeling, there is no need for front-to-rear differential action, and it is not desired to bleed fluid from the rear wheel motor circuit and lines 156 and 162 are blocked by the check valves. When the machine is in four-wheel drive mode, the check valves 160 and 166 are held open, and this permits equalization of pressures in the lines between front and rear wheel circuits with appropriate transfer of high pressure fluid from wheels having less demand to those having greater demand. The areas of orifices 138, 144, 148, 150, 158 and 164 are chosen such that adequate flow is permitted for differential action but not so much as to permit one or two wheels having limited traction to "spin out" and take all or substantially all of the working fluid from the wheels having good traction.

The schematic diagram shown in FIG. 4 shows a number of auxiliary components for the vehicle and their connections to the system. In FIG. 1, the line 25 was shown connected to the inlet side of power steering pump 26, and this line continues in FIG. 4 to the inlet side of a small boost pump 170 which supplies boost pressure to line 99 of FIG. 2 where it provides pressure to the two-speed, free wheeling and brake circuits as discussed above. This pump is driven through a mechanical connection from a fan motor 172 which delivers air to an oil cooler 174. A larger pump 176 drives fan motor 172 and also a hydraulic fan motor 178 which supplies air to a second oil cooler 180. A pressure relief valve 182 limits the pressure drop across oil coolers 174 and 180. Relief valve 184 connects any excessive pressures which might appear in the return line 62 and the inlet line to the oil coolers to drain. Similarly, relief valve 186 limits the output pressure from pump 176, and relief valve 188 performs a similar function with respect to pump 170. In addition to acting as the pump for the cooling fan motors, pump 176 maintains the low pressure side of the large pump 10 (line 30) at a sufficient level to avoid cavitation. A valve 192 connected downstream of pump 176 and fan motor 178 senses the pressure in return line 62. If this pressure in line 62 is low, the output from fan motor 178 is connected to line 62, as shown, which will tend to increase the pressure. If the pressure in line 62 is at the desired level, valve 192 will move to the opposite position, blocking line 178 and connecting the motor pump 62 to the drain line 194. A filter 190 is connected to pump 176.

While only a single embodiment has been shown and described herein, modifications will occur to those skilled in the art. Thus, while the free wheeling arrangements have been described in connection with a machine which operates in two-wheel drive with powered rear wheels, it obviously would be possible to adapt the arrangement described to a machine which always drives the front wheels and may "free wheel" the rear wheel. Other wheel braking arrangements may be used, if desired. The presence or absence of such auxiliary pumps as those numbered 170 and 176 might be a matter of choice depending upon the particular application.

I claim:

1. A propulsion and control system for a hydraulically propelled vehicle comprising a prime mover,
a high pressure pump driven by said prime mover,
a first pair of hydraulically driven motors operative as front wheels for said vehicle,
a second pair of hydraulically driven motors operative as rear wheels for said vehicle,
conduit means including first and second channels connecting said high pressure pump to each of said motors,
manually operable proportioning type valve means connected in said conduit means between the output of said high pressure pump and said motors, said valve means being capable of reversing the flow through said motors;
control valve means connected between one of said pairs of motors and said proportioning type valve means operative when in a first position to block high pressure fluid to said one pair of motors and operative when in a second position to admit high pressure fluid to said one pair of motors; and a manually operable two-position valve for controlling said control valve means; and
first and second conduits containing restricted orifices interconnecting the first and second channels, respectively, to said rear wheel motors, third and fourth conduits containing restricted orifices interconnecting the first and second channels respectively to said rear wheel motors, third and fourth conduits containing restricted orifices interconnecting the first and second channels respectively to said front wheel motors,
fifth and sixth conduits containing restricted orifices and check valve means interconnecting said first and second channels, respectively, to said front and rear wheel motors, said check valves being operative to close said conduits when said control valve means is in said first position.

2. A hydraulic drive system for a vehicle including a load device carried thereon, said vehicle including a plurality of hydraulically driven wheel motors having two speed ranges, a pair of front wheels for the vehicle, a pair of rear wheels for the vehicle, a prime mover, a high pressure pump driven by said prime mover, and conduit means including separate first and second channels connecting said pump to each of said hydraulically driven motors, and additional conduit means connecting said load across said high pressure pump;
operator-operated control means in each of said first and second channels including a reversible modulating valve for variably controlling flow of working fluid from said pump through said first and second channels to said hydraulically driven motor to control speed and direction of said motor, and a two-speed valve means downstream of said modulating valve for selecting a motor speed range;
a first conduit connecting the first channel of said conduit means for one of said wheels with the first channel of said conduit means for a paired wheel, and a variable orifice in said first conduit, and
a second conduit connecting the second channel of said conduit means for said one of said wheels with the second channel of said conduit means for the said paired wheel, and a variable orifice in said second conduit, such that when said paired wheels are caused to turn, working fluid may flow through said orifices to permit the paired wheels to rotate at different speeds; and separate free wheeling valve means connected between each wheel of said one of said pairs of wheels and its corresponding modulating valve, said valve means being selectively operative to block the flow of high pressure fluid to said pair of wheels to permit said pair of wheels to free wheel while the vehicle is driven by the opposite pair of wheels.

3. A hydraulic drive system for a vehicle as set forth in claim 2 wherein third and fourth conduits are provided connecting the corresponding first and second channels of said conduit means for said opposite pair of wheels, each of said third and fourth conduits having variable orifices, and
fifth and sixth conduits interconnecting said first and second channels for said first named pair of wheels with the first and second channels for said opposite pair of wheels, said fifth and sixth conduits including variable orifices and check valve means operative in response to free wheeling of said first named pair of wheels to block flow therethrough.

4. A hydraulic system for a vehicle as set forth in claim 3 wherein an auxiliary pump is connected to the inlet line to said high pressure pump to maintain adequate inlet pressure to prevent cavitation of said pump and a boost pump is driven by said auxiliary pump to provide pressure to operate said free wheeling valves and said two-speed valve means.

5. A hydraulic system for a vehicle as set forth in claim 2 wherein said hydraulically driven motors have two-speed capability with two inlet ports and an outlet port and are reversible by connecting high pressure pump output to said outlet port, said modulating valves being operable to cause proportional operation of said motors in either direction and said two-speed valve means are selectively operable to supply high pressure pump output to one of said inlet ports or to both of said inlet ports.

6. A hydraulic system for a vehicle as set forth in claim 5 wherein said motors have an additional port connected to a low pressure source and pressure regulating means are supplied to maintain said low pressure source at a pressure level substantially higher than atmospheric or drain pressure, and an accumulator is connected to each said additional port and said pressure-regulating means to abosrb any pressure surges in said motors.

7. A hydraulic system for a vehicle as set forth in claim 2 wherein one of said first or second channels is a return pressure line connected to said hydraulically driven motors and to said operator-operated control means and an auxiliary pump is provided to maintain the pressure in said return line at a level significantly higher than the inlet pressure to said high pressure pump.

8. A hydraulic system for a vehicle as set forth in claim 7 wherein at least one oil cooler is connected between said return line and the inlet line to said high pressure pump.

* * * * *